United States Patent
Zavalney et al.

(10) Patent No.: US 12,399,844 B1
(45) Date of Patent: Aug. 26, 2025

(54) GLOBAL MONITOR FOR MULTI-PORT MEMORY CONTROLLER

(71) Applicant: Silicon Laboratories Inc., Austin, TX (US)

(72) Inventors: Paul Zavalney, Austin, TX (US); Rejoy Roy Mathews, Austin, TX (US); Adrianus Bink, Oslo (NO)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/589,840

(22) Filed: Feb. 28, 2024

(51) Int. Cl.
*G06F 13/16* (2006.01)

(52) U.S. Cl.
CPC ...... *G06F 13/1626* (2013.01); *G06F 13/1663* (2013.01)

(58) Field of Classification Search
None
See application file for complete search history.

(56) References Cited

U.S. PATENT DOCUMENTS

| | | | |
|---|---|---|---|
| 9,064,135 B1* | 6/2015 | Poo | G06F 21/72 |
| 2009/0138670 A1* | 5/2009 | Mutlu | G06F 13/1663 |
| | | | 711/E12.001 |
| 2015/0242334 A1* | 8/2015 | Higham | G06F 3/0637 |
| | | | 711/163 |
| 2015/0378939 A1* | 12/2015 | Mohamed | G06F 13/1684 |
| | | | 711/150 |
| 2019/0163633 A1* | 5/2019 | Valk | G06F 12/0864 |

OTHER PUBLICATIONS

U.S. Appl. No. 17/990,178, filed Nov. 18, 2022, entitled "Multi-Port, Multi-Protocol, Varied Size RAM Controller," by Paul Ivan Zavalney et al.

* cited by examiner

*Primary Examiner* — Edward J Dudek, Jr.
*Assistant Examiner* — Ralph A Verderamo, III
(74) *Attorney, Agent, or Firm* — Trop, Pruner & Hu, P.C.

(57) ABSTRACT

In one embodiment, an apparatus includes: a fabric circuit to couple between a plurality of managers and a memory; and multi-bank memory control circuitry coupled to the fabric circuit and to couple to a plurality of banks of the memory and including a plurality of first ports to receive memory requests from the plurality of managers, The multi-bank memory control circuitry is to enable each of the plurality of managers to access the memory in parallel. A global monitor is coupled to the multi-bank memory control circuitry and includes a plurality of second ports and a plurality of state machines, each of the plurality of state machines to be associated with one of the plurality of managers. Each of the plurality of state machines is configured to enforce exclusivity of a memory region on behalf of a manager and concurrently enable non-exclusive access to the memory region.

20 Claims, 9 Drawing Sheets

GLOBAL MONITOR FOR MULTI-PORT MEMORY CONTROLLER

BACKGROUND

Processors such as ARM M33, ARM M55, and RISC-V processors provide synchronization primitives and instructions to enable a non-blocking mechanism for a thread or process to obtain exclusive access to a memory location. Software can use these primitives to implement semaphores or an exclusive read-modify-write memory sequence. The processors have a concept of both a Local Monitor and a Global Monitor.

The processor first checks its Local Monitor to synchronize between threads executing on the same processor, with respect to a memory location. If multiple processors need to share a memory location, then the processor uses the Global Monitor to determine if it has exclusive access to the memory location, to synchronize between different processors. This conventional Global Monitor is a subordinate memory element with a single bus port entry for all processors. This single port ensures a sequential ordering of requests and guarantees exclusive checks, but it can be a performance bottleneck.

SUMMARY OF INVENTION

In one aspect, an apparatus includes: a fabric circuit to couple between a plurality of managers and a memory; multi-bank memory control circuitry coupled to the fabric circuit, the multi-bank memory control circuitry couple to a plurality of banks of the memory and comprising a plurality of first ports to receive memory requests from the plurality of managers, the multi-bank memory control circuitry to enable each of the plurality of managers to access the memory in parallel; and a global monitor coupled to the multi-bank memory control circuitry, the global monitor comprising a plurality of second ports and a plurality of state machines, each of the plurality of state machines to be associated with one of the plurality of managers, wherein each of the plurality of state machines is configured to enforce exclusivity of a memory region on behalf of a manager and concurrently enable non-exclusive access to the memory region.

In one implementation, the fabric circuit is to: steer exclusive memory requests to the global monitor; and steer non-exclusive memory requests to the multi-bank memory control circuitry. The global monitor may sequentially process the exclusive memory requests, and may initialize each of the plurality of state machines into an open state.

In one embodiment, a first state machine of the plurality of state machines is associated with a first manager, and is to: receive a first exclusive memory read request for a first memory region; and in response to the first exclusive memory read request, transition to an exclusive state. The first state machine can set a tagged address to an address of the first memory region and cause data from the first memory region to be provided to the first manager. Also, the first state machine is to allow an exclusive write request from the first manager to occur when the exclusive write request includes: a first identifier that matches an identifier of the first state machine; a second identifier that matches a bus transaction identifier for the first exclusive memory read request; and the tagged address.

In an embodiment, a second state machine of the plurality of state machines is associated with a second manager, and is to: receive a second exclusive memory read request for the first memory region; in response to the second exclusive memory read request, transition to the exclusive state; and in response to an exclusive write request from the first manager for the first memory region, prevent the second manager from writing to the first memory region. When the second state machine is in the exclusive state, a third state machine of the plurality of state machines associated with a third manager may enable the third manager to exclusively write to another memory region.

In an embodiment, the first state machine is to prevent an exclusive write transaction to another memory region from the first manager when the first state machine is in the exclusive state. When the first state machine is in the exclusive state, a second manager of the plurality of managers can non-exclusively access the first memory region. In response to the non-exclusive access to the first memory region by the second manager, the first state machine is to transition from the exclusive state to the open state.

In an embodiment, the apparatus further includes: a multiplexer coupled to the plurality of managers via the plurality of second ports, the multiplexer to arbitrate between multiple memory requests from the plurality of managers and provide a selected exclusive memory request to the global monitor; and a demultiplexer coupled between the global monitor and the multi-bank memory control circuitry, the demultiplexer to direct the selected exclusive memory request to the multi-bank memory control circuitry. In an embodiment, the apparatus may be a multi-port memory controller, and the global monitor is to enable exclusive access to the memory region that is of a single byte size.

In another aspect, a method includes: receiving, via a plurality of ports of a global monitor, a plurality of exclusive memory requests from a plurality of processors; selecting, from the plurality of exclusive memory requests, a first exclusive memory request having a first address of a first memory region, from a first processor of the plurality of processors, and: transitioning a first state machine of the global monitor to an exclusive state, the first state machine associated with the first processor; and tagging the first state machine with the first address; and while the first state machine is in the exclusive state, monitoring access to the first memory region, comprising: enabling at least one other processor of the plurality of processors to non-exclusively access the first memory region; or enabling the at least one other processor to exclusively access the first memory region. In response to the non-exclusive access to the first memory region by the at least one other processor, the first state machine is maintained in the exclusive state, to enable the first processor to exclusively access the first memory region in response to another exclusive memory request having the first address from the first processor. In response to the exclusive access to the first memory region by the at least one other processor, the first state machine is transitioned to an open state, to prevent the first processor from exclusive access to the first memory region in response to the another exclusive memory request having the first address from the first processor.

In an embodiment, the method further includes arbitrating between the first exclusive memory request and the exclusive access to the first memory region by that at least one other processor to select the first exclusive memory request. The method may also include monitoring, via the global monitor, non-exclusive memory requests to identify the non-exclusive access to the first memory region by the at least one other processor.

In yet another aspect, a system includes: a system on chip comprising a plurality of cores, each of the plurality of cores to independently access a memory; a multi-port memory controller coupled to the plurality of cores; and the memory coupled to the multi-port memory controller, where the memory includes a plurality of banks.

In an embodiment, the multi-port memory controller is to receive memory requests from the plurality of cores and enable at least some of the plurality of cores to access the memory concurrently. The multi-port memory controller may include a global monitor comprising a plurality of state machines, each of the plurality of state machines to be associated with one of the plurality of cores, where each of the plurality of state machines is configured to monitor a memory region for exclusive memory requests and non-exclusive memory requests.

In an embodiment, the multi-port memory controller comprises: a multiplexer coupled between the plurality of cores and the global monitor to arbitrate between a plurality of the exclusive memory requests and provide a selected exclusive memory request for a first memory region to the multi-port global monitor; and a demultiplexer coupled between the global monitor and the plurality of banks of the memory, the demultiplexer to direct the selected exclusive memory request to one of the plurality of banks, the one of the plurality of banks having the first memory region.

In an embodiment: in response to a first exclusive read request for a first memory region from a first core, a first state machine of the plurality state machines is to transition to an exclusive state and monitor access to the first memory region; and in response to a second exclusive read request for the first memory region from a second core, a second state machine of the plurality state machines is to transition to the exclusive state and monitor access to the first memory region. In response to an exclusive write request for the first memory region from the second core, the global monitor is to allow the exclusive write request to be directed to the first memory region and transition the first state machine and the second state machine to an open state.

DETAILED DESCRIPTION

In various embodiments, a multi-port memory controller is provided to enable each of a plurality of processors or managers to have a separate port to access the memory controller and, in turn, a coupled memory. With this arrangement, high throughput access to the memory can be realized, as each processor or manager can access different regions of the memory in parallel. Understand that as used herein, the term "manager" refers to any processing entity or other entity that can issue memory requests to a memory.

In embodiments, the multi-port memory controller includes a global monitor to perform proper exclusivity checks for the memory (which may be implemented as a multi-bank memory) and provide high bandwidth for concurrent access from multiple managers for non-exclusive accesses. Bus transactions with an exclusive bus attribute are steered to the global monitor, which sequentially processes the exclusive transactions, ensuring proper exclusivity checks. If the exclusivity check passes, then the transaction is directed to the appropriate memory region. Bus transactions with a non-exclusive bus attribute are steered directly to the targeted memory region. In this way, parallel access is not blocked even when another processor is actively performing an exclusive transaction via the global monitor.

Figure 1:
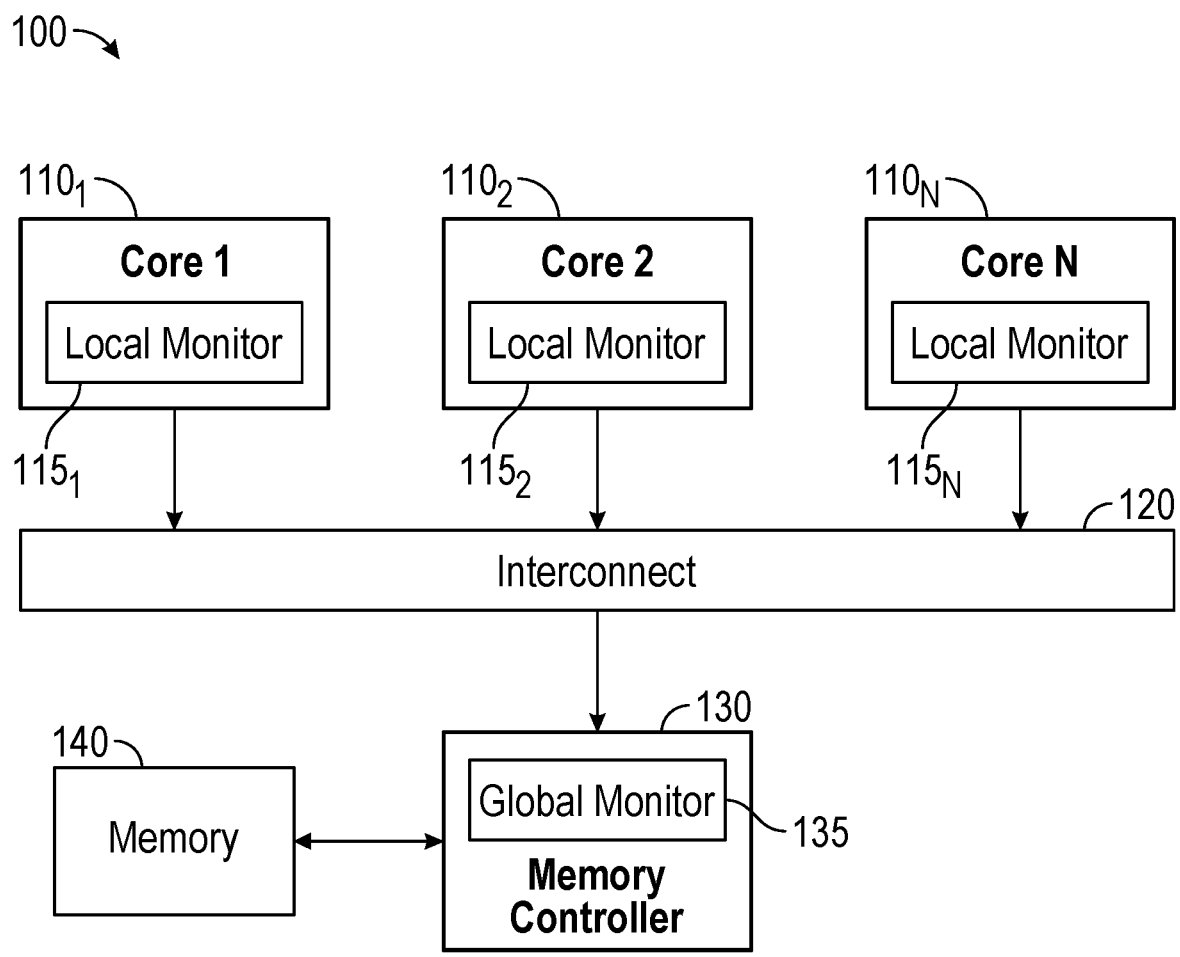
FIG. 1 is a block diagram of an apparatus in accordance with an embodiment.

Referring now to FIG. 1, shown is a block diagram of an apparatus in accordance with an embodiment. As illustrated in FIG. 1, apparatus 100 may be any type of computing device having processor circuitry and memory. In particular embodiments described herein, apparatus 100 may be a wireless device such as an Internet of Things (IoT) device, smartphone, tablet, laptop computer or so forth. Understand that in the high level shown in FIG. 1 only a few components are shown to illustrate the local and global monitor arrangement of embodiments.

As illustrated, apparatus 100 includes a plurality of cores 1101-N. The various cores may be heterogenous or homogeneous cores, and may include microcontrollers, digital signal processors and so forth. In particular embodiments, one or more cores 110 may be implemented as ARM cores such as ARM M33 cores, and one or more of the cores may be of a different family of cores, e.g., a RISC-V core 110N.

In any event, each core 110 includes a local monitor 1151-N. In embodiments, each local monitor 115 may be configured to determine, at least in part, whether the corresponding core has valid access to a given memory region. With embodiments, local monitors 115 operate in connection with a global monitor 135, which in the embodiment of FIG. 1 is implemented within a memory controller 130 coupled to cores 110 via an interconnect 120.

Although a single interconnect is illustrated, understand that different core types may couple to memory controller 130 via different interconnects. Interconnect 120 may be implemented at least in part using the ARM Advanced Microcontroller Bus Architecture (AMBA) Advanced High-Speed Bus (AHB). In other embodiments, interconnect 120 may implement an OBI (Open Bus Interface), AMBA AXI (Advanced extensible Interface) or SLAXI (Silicon Labs Advanced extensible Interface), or combinations thereof.

Memory controller 130 is a multi-port memory controller that, in turn, couples to a memory 140 which in one or more embodiments may be a random access memory (RAM). Depending on implementation, memory controller 130 may be integrated in an integrated circuit with cores 110, e.g., as part of a system on chip. In other embodiments, memory controller 130 may be implemented in a separate integrated circuit (and in some cases may be included in memory 140).

As will be described further herein, the combination of local monitors 115 and global monitor 135 enables multiple cores 110 to exclusively access particular memory regions in a multi-port manner to realize high bandwidth for concurrent accesses from multiple managers (e.g., cores 110) for exclusive and non-exclusive accesses.

Global monitor 135 enables synchronization between cores 110 by using exclusive read and exclusive write memory accesses (also referred to herein as exclusive loads and exclusive stores, respectively). In a typical use case, one core 110 reads from a memory region of memory 140 with an exclusive access (e.g., using an ARM exclusive load (LDREX) instruction). This memory location or region is allocated with exclusive designation for this core. If no other modifications occurred to that region, then a later exclusive write (e.g., using an ARM exclusive store (STREX) instruction) successfully writes the data. If the memory location was modified between the exclusive load access and the ensuing exclusive write access, then the memory region is not written, and a non-successful return status is given.

Exclusive accesses to memory locations marked as shareable are checked against both local monitor 115 and global monitor 135. That is, any exclusive write access operation that targets shareable memory causes a check both to local monitor 115 and global monitor 135 to determine whether it can update memory. As will be described below, global monitor 135 may include a plurality of global monitor state machine, each associated with a given core 110 (or other manager of memory) to keep track of a tagged memory region and its state, being OPEN or EXCLUSIVE. In one or more embodiments, there can only be one tagged memory region per processor.

Memory locations that are marked as non-shareable are checked in local monitor 115 but not in global monitor 135, nor result in an exclusive bus transaction. On the flipside, there can be multiple cores 110 tagging the same memory region due to each core 110 having its own state machine within global monitor 135. In the case of the same memory region being tagged EXCLUSIVE, if both cores attempt to perform an exclusive store, the first core to perform it is successful (and thus its data is written), while the second core receives a non-successful status and can re-allocate the memory region by performing another exclusive read.

Note in some embodiments, global monitor 135 can be controlled to be enabled to support load (read) and store (write) exclusive transfers, or not, e.g., depending on a configuration setting, e.g., an enable parameter (GLOBAL_MONITOR_EN). When the global monitor is enabled, all memory may be assumed to be shareable.

Each global monitor state machine is configured to store a tagged address region. In one or more embodiments, the size or range of an exclusive tagged address region can be word, halfword, or byte, based on the bus address and transaction size. The exclusive tagged address region is aligned to the transfer size of word, halfword, or byte. Any overlap of a tagged address with a transfer constitutes a partial match for the purpose of state transitions. In one or more embodiments, exclusive transfers succeed if the load exclusive and store exclusive have the same address, monitor ID that identifies the requester FSM, transaction ID that identifies the original load exclusive transaction, and transaction size.

Figure 2:
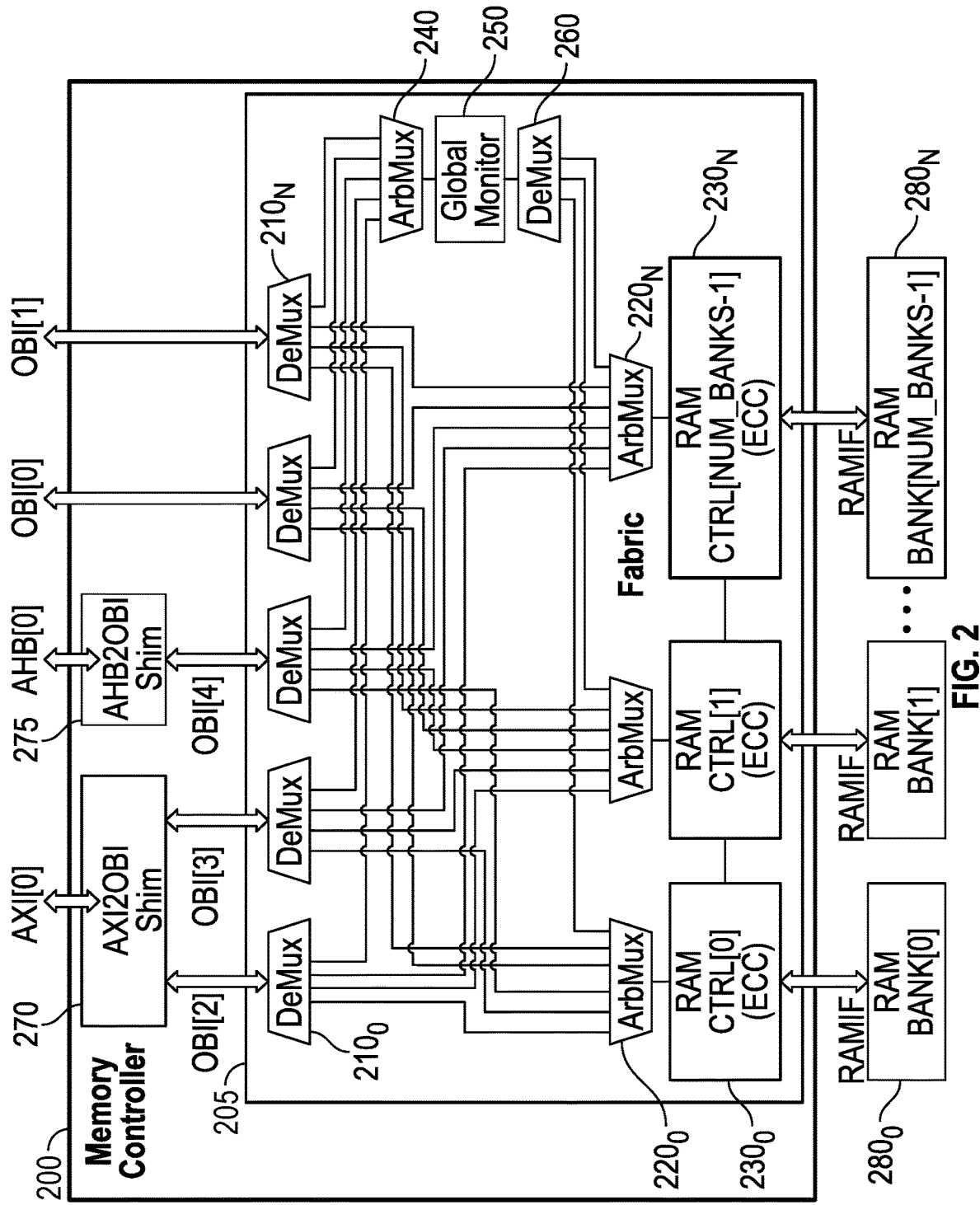
FIG. 2 is a block diagram of a multi-port memory controller in accordance with an embodiment.

Referring now to FIG. 2, shown is a block diagram of a multi-port memory controller in accordance with an embodiment. As shown, memory controller 200 couples to a memory 280, e.g., a multi-bank random access memory (RAM). In an embodiment, memory controller 200 may be implemented on a common semiconductor die with one or more processors, e.g., of a SoC, and or on a common semiconductor die with the memory itself. In other cases, memory controller 200 may be implemented as a standalone memory controller. In any event, memory controller 200 includes multiple ports to enable plural managers to access memory 280 concurrently.

Memory controller 200 is able to accommodate multiple different bus protocols, including an AXI bus, an AHB bus and an OBI bus, via which it receives memory requests from multiple managers, e.g., different cores of one or more SoCs. To allow memory controller 200 to operate with multiple bus protocols, a plurality of shim circuits are used to translate from one bus protocol to another bus protocol. As shown in FIG. 2, these shim circuits include an AHB-to-OBI shim circuit 275, and an AXI-to-OBI shim circuit 270. Note that if different subsystems of an SoC use other bus protocols, such as SLAXI, additional or different shim circuits may be utilized.

Memory controller 200 includes a fabric 205. Fabric 205 is used to route data to and from the appropriate RAM bank and bus port, where each bus port connects to a respective host or subsystem bus. Fabric 205 includes a plurality of demultiplexers $210_{0-N}$. In one embodiment, one demultiplexer 210 corresponds to each 32-bit bus port, such that fabric 205 is configured to operate using 32 bit wide data paths. More generally, fabric 205 can operate using a width that is the smallest bus port width or smallest individually addressable memory width (which can be as small as 8 bits, in an embodiment).

Demultiplexers 210 are configured to determine the destination of a data transaction. Thus, each demultiplexer 210 has a plurality of outputs, corresponding to the number of RAM banks 280 that are present, and an additional output that is routed to a global monitor 250, discussed further below. In turn each demultiplexer 210 routes a transaction from its respective bus port to an arbiter $220_{0-N}$ associated with an intended RAM bank 280. Arbiters 220 are configured to receive and prioritize transaction requests from the various demultiplexers 210, such that the highest priority request gains access to RAM bank 240.

To enable multi-port memory controller 200 to handle exclusive memory requests concurrently, global monitor 250 is present. As shown, global monitor 250 is coupled to receive incoming exclusive memory requests via an arbiter 240. Arbiter 240 is configured to arbitrate between multiple incoming exclusive memory requests and select a given request based at least in part on priority of the request. In an embodiment, a highest priority request gains access to global monitor 250. In one implementation, priority is determined by an arbitration scheme like a round-robin arbitration. This selected exclusive memory request is provided to global monitor 250 for processing.

More specifically, global monitor 250 includes a plurality of global monitor state machines that operate to track exclusive accesses to particular memory regions. When a given exclusive memory request is allowed to proceed, it is sent via demultiplexer 260 to the corresponding memory bank including the memory region.

In certain embodiments, control logic 230 is disposed between each arbiter 220 and its respective RAM bank 240. This control logic 230 is used to generate error correcting codes (ECC) for data being written to RAM bank 280. The control logic 230 is also used to ensure the validity of any data read from RAM bank 280 by verifying the ECC and performing any error corrections that are needed. The control logic 230 is also used to generate timing signals used by memory 280.

Figure 3:
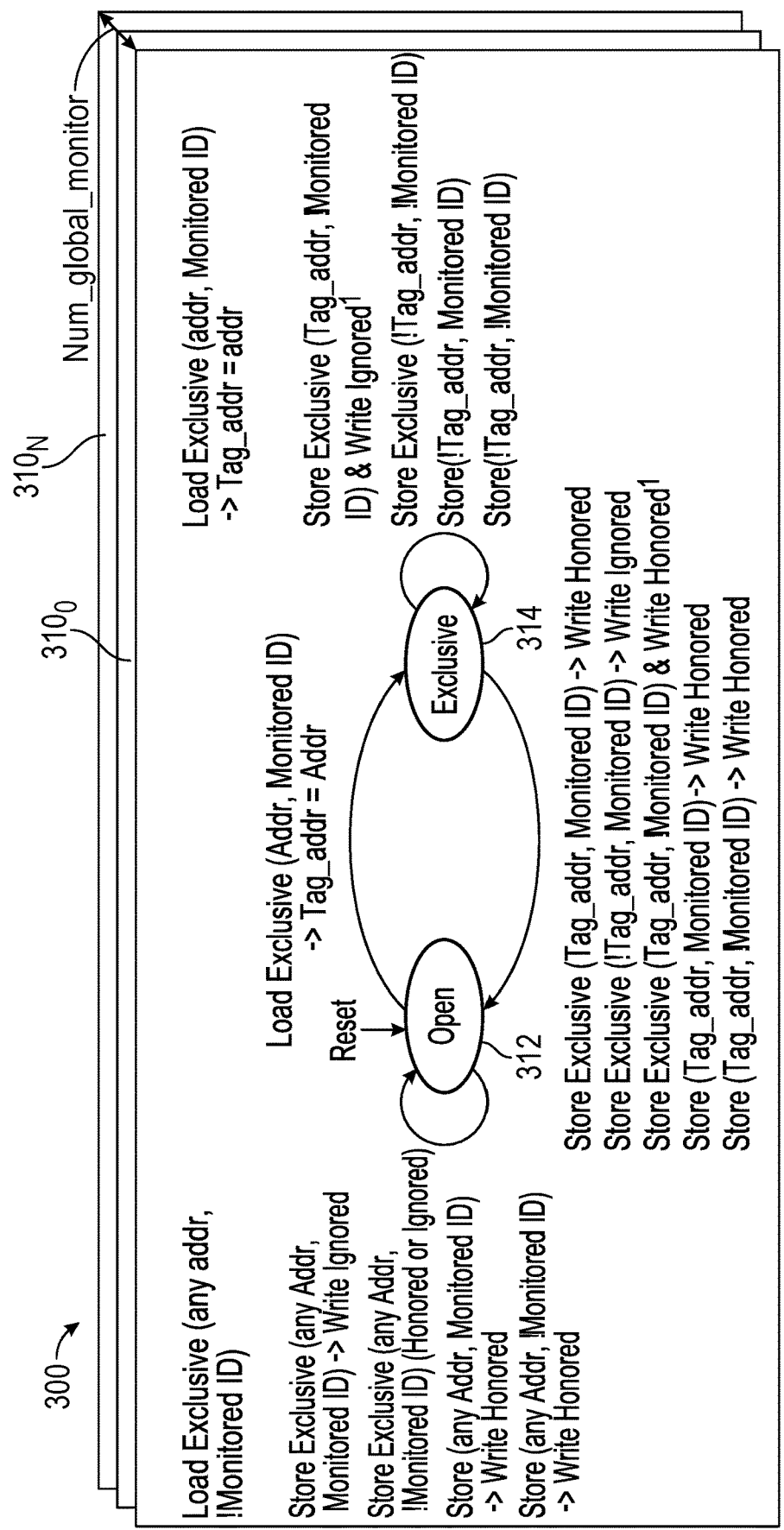
FIG. 3 is a diagram illustrating operation of a global monitor state machine in accordance with an embodiment.

Referring now to FIG. 3, shown is a diagram illustrating operation of a global monitor state machine in accordance with an embodiment. As shown in FIG. 3, a global monitor 300 includes a plurality of global monitor state machines 3100-310N. In embodiments herein, each global monitor state machine 310 may be implemented as a finite state machine (FSM), although other implementations are possible, such as providing programmable logic for each of the state machines. In one or more embodiments, there may be a corresponding global monitor FSM 310 for each manager capable of exclusive access in a system.

In FIG. 3, operation of a representative global monitor FSM 3100 is illustrated. As shown, global monitor FSM 310 includes two states, namely an OPEN state 312 and an EXCLUSIVE state 314. Depending upon the type of memory request, global monitor state machine FSM 310 transitions between these two states. On reset or other initialization of a memory controller including a global monitor, OPEN state 310 is entered. Operation remains in that state until an exclusive read memory request is received having a manager ID (namely, an identifier for the given state machine). As shown in FIG. 3, global monitor state machine 310 transitions from OPEN state 312 to EXCLUSIVE state 314 in response to a load exclusive request for a given memory region (having an address (ADDR)) and an ID that matches the given monitor.

As further illustrated in FIG. 3, operation remains in EXCLUSIVE state 314 until a write request (either exclusive or non-exclusive) is received, depending on manager ID and address. Of course while this particular set of rules for a global monitor state machine is shown in FIG. 3, other embodiments may provide a different rule set. Also understand that for ease of illustration, not all arcs (e.g., load exclusive to other monitored ID machines in either state) are illustrated. A more exhaustive behavior set is further described in Table 1.

In FIG. 3, the arguments for the Load Exclusive(arg1, arg2) are defined as: (1) read address; and (2) the condition that the manager ID matches the monitored ID for this state machine. The arguments for the Store Exclusive(arg1, arg2) are defined as: (1) the condition that the address matches the tag address; and (2) the condition that the manager ID matches the monitored ID for this state machine.

In the embodiment of FIG. 3, the example access request Store (!tag_addr, monitor ID) implies that the tag address does not match, and the manager ID does match.

Only an exclusive read can change the global monitor state machine state from OPEN to EXCLUSIVE, and it also updates the tagged address. If already in an EXCLUSIVE state, an exclusive load changes the tagged address, and causes the state machine to remain in the EXCLUSIVE state.

An exclusive read with a manager ID causes the respective global monitor state machine to transition to the EXCLUSIVE state, tag the address region with the given read address, and return the read data with a successful response (e.g., EXOKAY). An exclusive read whose manager ID does not match any monitored ID returns the read data with an unsuccessful response (e.g., OKAY). Only a write (exclusive or non-exclusive) can change the global monitor state machine state from EXCLUSIVE to OPEN, depending on the manager ID and address. For each global monitor state machine, a write may change the state of the affected global monitor state machines. Additionally, exclusive writes may or may not be blocked from updating the memory, and a corresponding bus status is sent back to the processor to give it status whether the exclusive write was or was not successful.

In one implementation, a clear exclusive instruction (e.g., an ARM CLREX instruction) does not change the global monitor state, but may clear the local monitor state within the processor. To clear the global monitor state and transition it to OPEN, a dummy store exclusive may be executed to a different address within the memory space (and where it does not match the tagged address).

A non-exclusive write results in updating the memory (barring other checks such as integrity checks), and may also change the state of affected global monitor state machines.

Table 1 below lists all the actions incurred by a write operation with regard to the global monitor state machine in accordance with an embodiment.

TABLE 1

| Write Mode | Manager ID | Tagged Address | Non-Match Transaction | Current State | Write Operation | Response | Next State | Comment |
|---|---|---|---|---|---|---|---|---|
| Exclusive | Match | Match | | EXCLUSIVE | Write memory | successful | OPEN | successful exclusive store |
| Exclusive | Match | Match | | OPEN | Ignored | Unsuccessful | OPEN | Unsuccessful exclusive store |
| Exclusive | Match | Non-Match | | EXCLUSIVE | Ignored | Unsuccessful | OPEN | Unlikely condition |
| Exclusive | Match | Non-Match | | OPEN | Ignored | Unsuccessful | OPEN | of an exclusive write to a non-matching tagged address |
| Exclusive | Non-Match | Match | Memory write was successful | EXCLUSIVE[1] | | | OPEN | A successful exclusive write to another global monitor will result in all other monitors going to the OPEN state that shares the same address. |

TABLE 1-continued

| Write Mode | Manager ID | Tagged Address | Non-Match Transaction | Current State | Write Operation | Response | Next State | Comment |
|---|---|---|---|---|---|---|---|---|
| Exclusive | Non-Match | Match | Memory write was unsuccessful | EXCLUSIVE[1] | | | EXCLUSIVE | An unsuccessful exclusive write to another global monitor does not change other global monitors state as memory content did not change. |
| Exclusive | Non-Match | Non-Match | Write was either successful or unsuccessful | EXCLUSIVE[1] | | | EXCLUSIVE | Writes to other global monitor state machines may go through. Since ID and tagged address does not match, this machine's state does not change |
| Exclusive | Non-Match | Non-Match | Write was either successful or unsuccessful | OPEN[1] | | | OPEN | |
| Non-Exclusive | Match | Match | | EXCLUSIVE | Write memory | successful | OPEN | All non-exclusive writes will go through. This machine's state changes to OPEN as the memory content has changed |
| Non-Exclusive | Match | Match | | OPEN | Write memory | successful | OPEN | All non-exclusive writes will go through. |
| Non-Exclusive | Match | Non-Match | | EXCLUSIVE | Write memory | successful | EXCLUSIVE | |
| Non-Exclusive | Match | Non-Match | | OPEN | Write memory | successful | OPEN | |
| Non-Exclusive | Non-Match | Match | Memory write was successful | EXCLUSIVE[1] | | | OPEN | All non-exclusive writes will not be blocked. This machine's state changes to OPEN as the memory content has changed |
| Non-Exclusive | Non-Match | Match | Write was either successful or unsuccessful | OPEN[1] | | | OPEN | All non-exclusive writes will go through. |
| Non-Exclusive | Non-Match | Non-Match | Write was either successful or unsuccessful | EXCLUSIVE[1] | | | EXCLUSIVE | |

TABLE 1-continued

| Write Mode | Manager ID | Tagged Address | Non-Match Transaction | Current State | Write Operation | Response | Next State | Comment |
|---|---|---|---|---|---|---|---|---|
| Non-Exclusive | Non-Match | Non-Match | Write was either successful or unsuccessful | OPEN[1] | | | OPEN | |

[1]This is the state is of a matching global monitor state, not the state of the manager writing and it's corresponding non-matching global monitor state.

Figure 4:
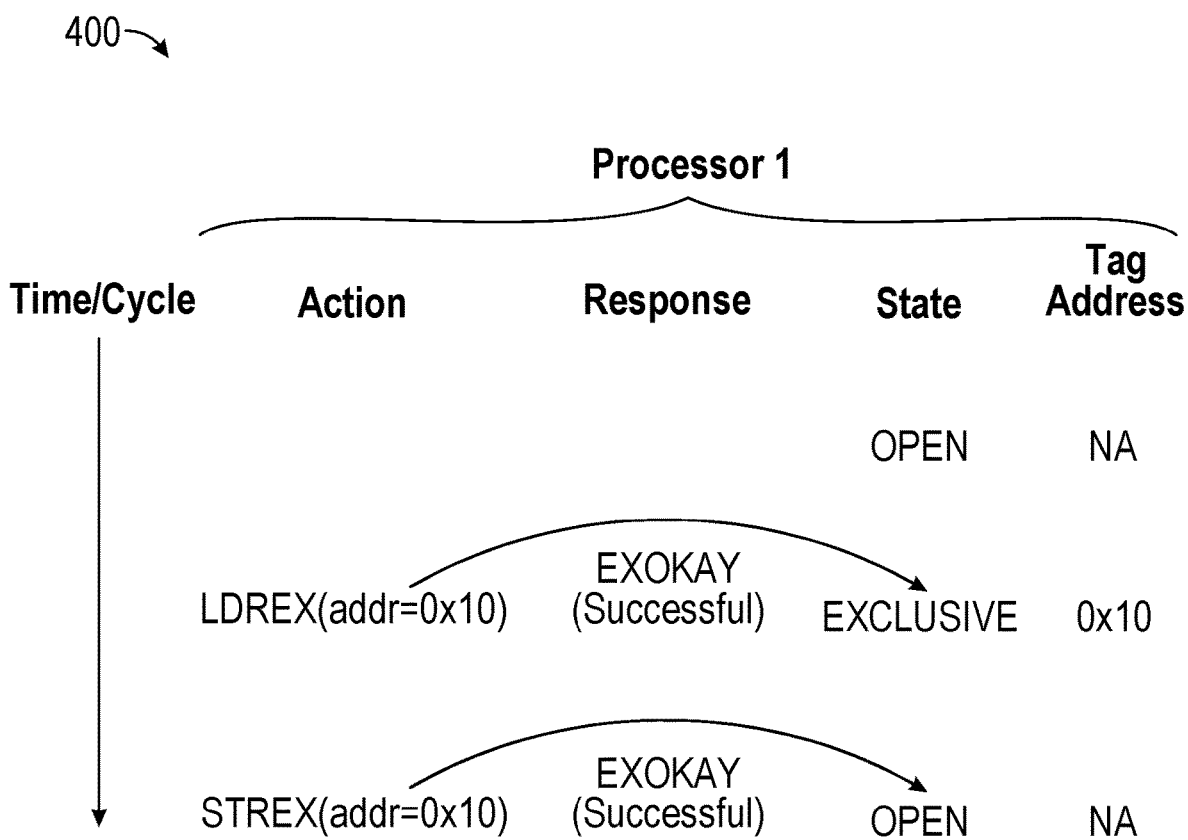
FIG. 4 is a diagram illustrating one example of global monitor state transitions in accordance with an embodiment.

Referring now to FIG. 4, shown is a diagram illustrating one example of global monitor state transitions in accordance with an embodiment. As shown in FIG. 4, illustration 400 details a processor that performs an LDREX followed by a STREX at the same address, where both transactions have a successful (EXOKAY) response. As shown, the state for the global monitor FSM of the monitored ID transitions seamlessly from OPEN to EXCLUSIVE, and back to OPEN.

Figure 5:
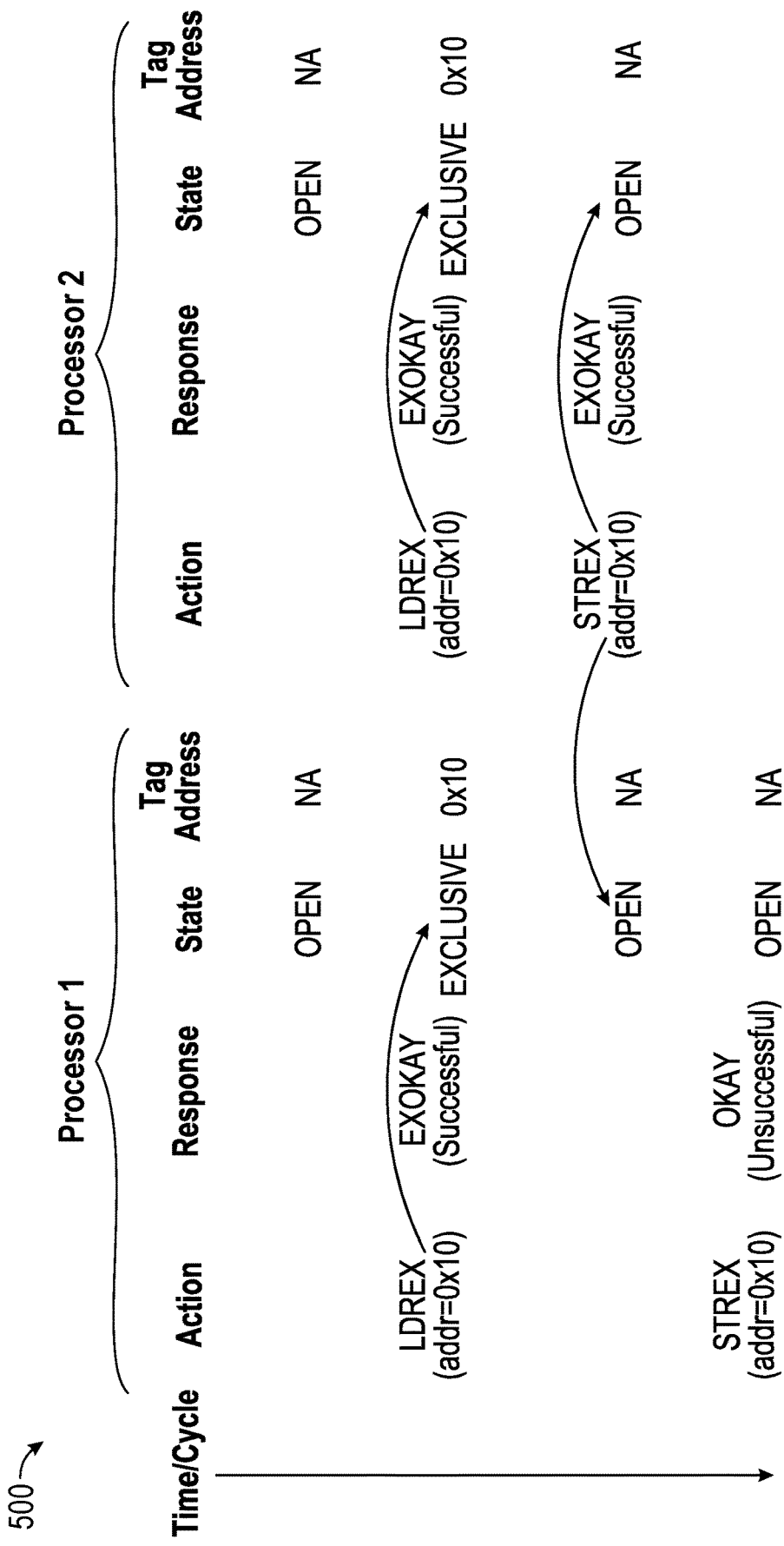
FIG. 5 is a diagram illustrating another example of global monitor state transitions in accordance with an embodiment.

FIG. 5 is a diagram illustrating another example of global monitor state transitions in accordance with an embodiment. As shown in FIG. 5, illustration 500 details a scenario where two processors access the same address location with exclusive accesses. Both processors issue a LDREX instruction, each of which triggers an independent global monitor state machine to transition to the EXCLUSIVE state. The second processor then performs a STREX with a successful response. Note that this access matches both state machines' tag addresses. As a result, this access causes both processor's global monitor state machine to transition to the OPEN state. When the first processor thereafter attempts a STREX, the write does not go through, and an unsuccessful response (OKAY) is given.

Figure 6:
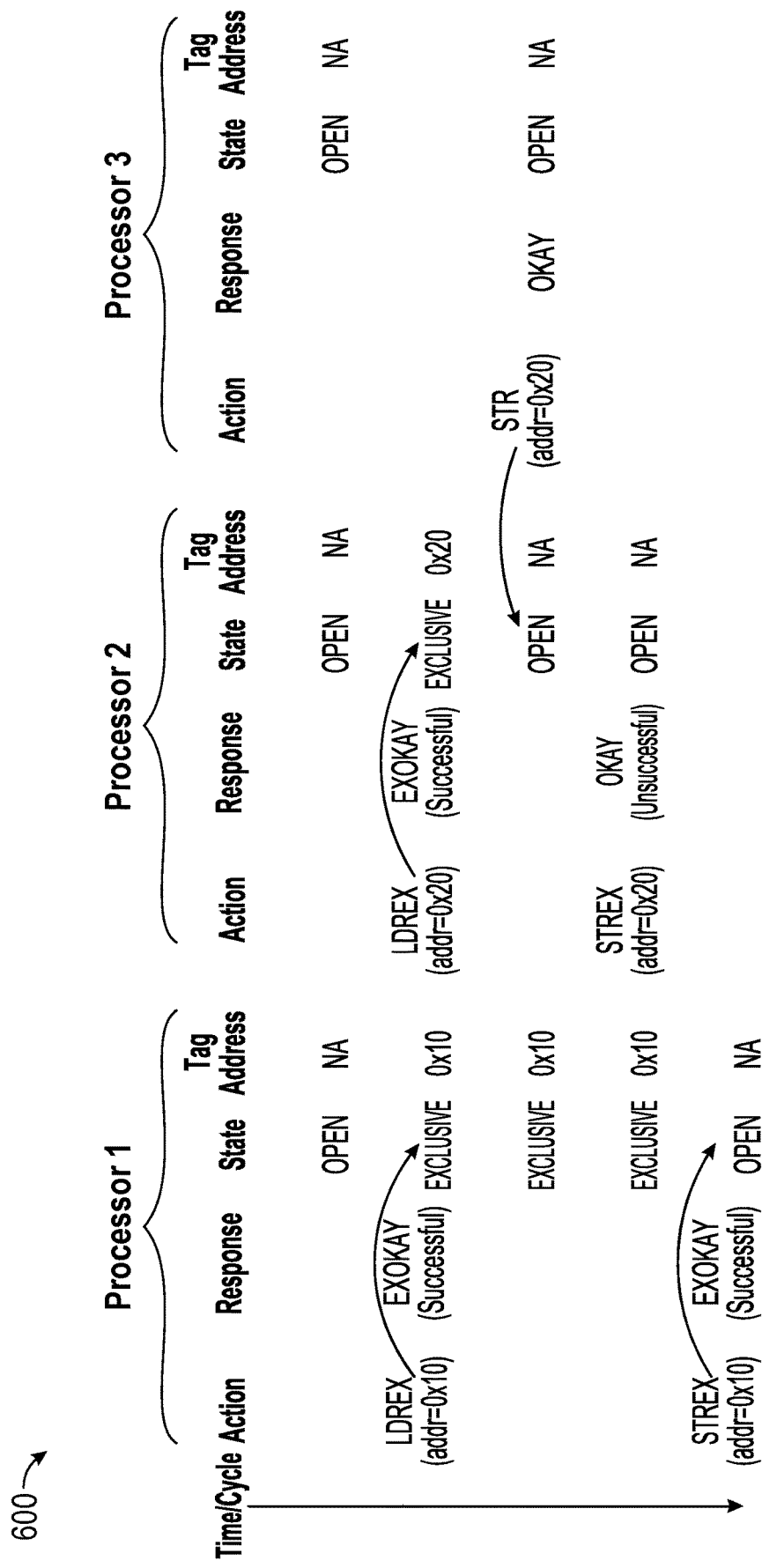
FIG. 6 is a diagram illustrating yet another example of global monitor state transitions in accordance with an embodiment.

FIG. 6 is a diagram illustrating yet another example of global monitor state transitions in accordance with an embodiment. As shown in FIG. 6, illustration 600 details a scenario where a third processor can perform a non-exclusive write access and cause a state transition in the second processor's global monitor state to OPEN, since that address of this non-exclusive write access matches the second processor's tagged address. As further shown, when the second processor thereafter attempts a STREX, it is unsuccessful. However since the first processor's tagged address is different, its state is unaffected by the other processors' accesses.

Figure 7:
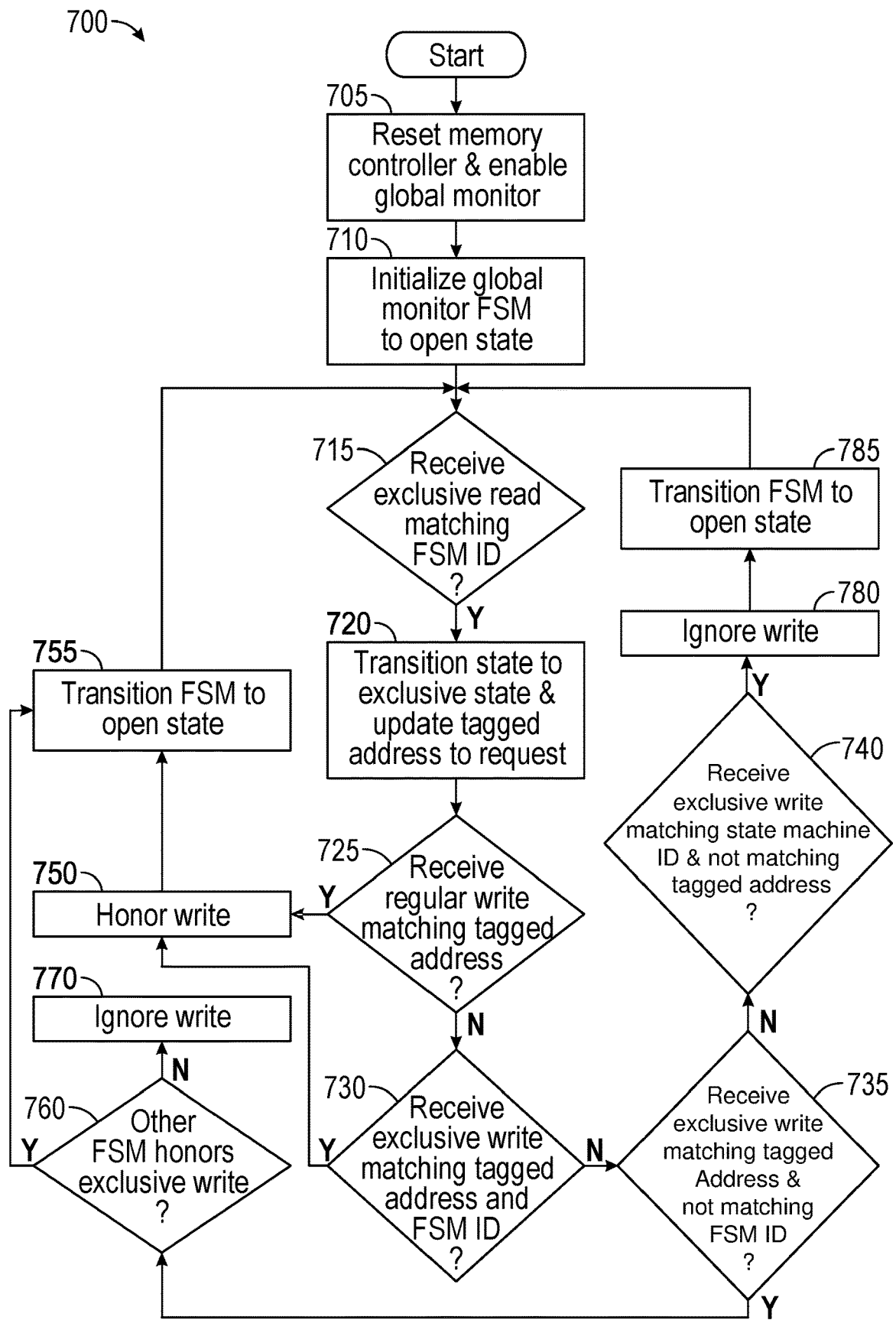
FIG. 7 is a flow diagram of a method in accordance with an embodiment.

Referring now to FIG. 7, shown is a flow diagram of a method in accordance with an embodiment. More specifically, method 700 of FIG. 7 illustrates operation of a global monitor in accordance with an embodiment. As illustrated, method 700 begins by resetting a memory controller and enabling the global monitor (block 705). The following discussion regards operation within a single global monitor state machine; operation may proceed similarly and concurrently for one or more other state machines.

As shown, at block 710 a global monitor FSM (e.g., a given one of the FSMs) is initialized to the OPEN state (understand that all global monitor FSMs may be initialized to the OPEN state on reset). Next it is determined at diamond 715 whether an exclusive read is received matching the ID for the global monitor FSM. If so, control passes to block 720 where the global monitor FSM is transitioned to the EXCLUSIVE state. Still further, a tagged address for this global monitor FSM is updated to the address of the exclusive read request. Understand also that a transaction ID for this exclusive read request also may be stored.

Still referring to FIG. 7, next at diamond 725, it is determined whether a regular (non-exclusive) write request is received having a matching tagged address. If so, at block 750 the write is honored and control passes to block 755, where the global monitor FSM is transitioned back to the OPEN state. This is so, since the non-exclusive write by another manager causes the original manager that obtained exclusive access to lose the exclusive access.

If no regular write is received at diamond 725, at diamond 730 it is determined whether an exclusive write request is received with a matching tagged address and FSM ID (and bus transaction ID, in some embodiments). In this instance it is the original exclusive read requester that now seeks to exclusively write data. In this case, control again passes to blocks 750 and 755, so that the exclusive write is honored and the global monitor FSM is transitioned back to the OPEN state.

If instead it is determined at diamond 735 that an exclusive write request is received that matches the tagged address but does not match the FSM ID, control passes to diamond 760 to determine whether the other FSM (namely that global monitor FSM associated with the FSM ID) honors the exclusive write. If so, control passes to block 755 where the global monitor FSM transitions to the OPEN state. Instead if at diamond 760 it is determined that the other global monitor FSM does not honor the exclusive write, the write is ignored (at block 770).

Still with reference to FIG. 7, it can also be determined whether an exclusive write request is received with a matching FSM ID but a tagged address that does not match (diamond 740). In this instance, the write is ignored (block 780), and the global monitor FSM transitions to the OPEN state (block 785). Understand while shown at this high level in the embodiment of FIG. 7, many variations and alternatives are possible.

Figure 8:
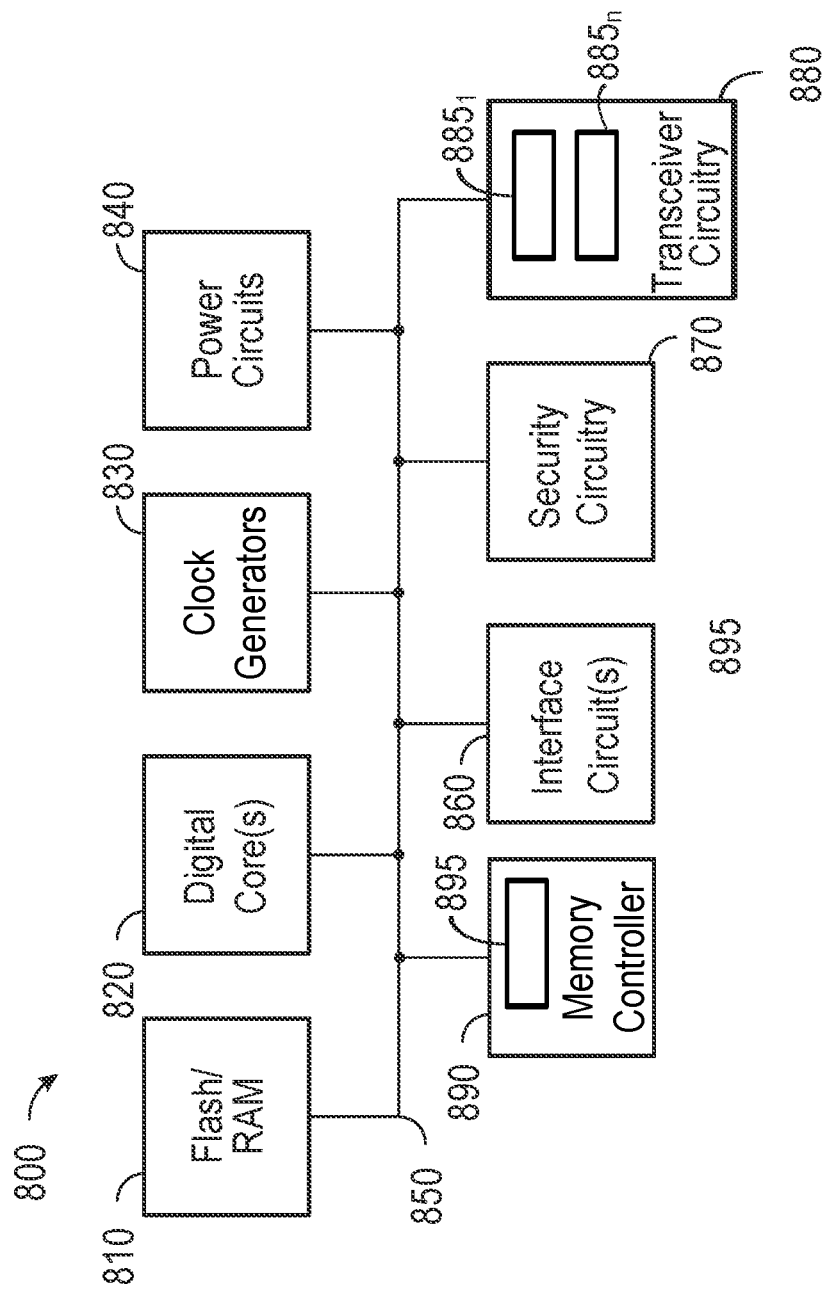
FIG. 8 is a block diagram of a representative integrated circuit that incorporates an embodiment.

Referring now to FIG. 8, shown is a block diagram of a representative integrated circuit 800 that includes multi-port memory controller circuitry in accordance with an embodiment. In the embodiment shown in FIG. 8, integrated circuit 800 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 800 shown in FIG. 8 may be implemented on a single semiconductor die.

Integrated circuit 800 may be included in a range of devices including a variety of stations, including smartphones, wearables, smart home devices, IoT devices, other consumer devices, or industrial, scientific, and medical (ISM) devices, among others.

In the embodiment shown, integrated circuit 800 includes a memory system 810 which in an embodiment may include volatile storage, such as RAM and non-volatile memory as a flash memory. The flash memory is a non-transitory storage medium that can store instructions and data. As further shown integrated circuit 800 also may include a memory controller 890. As shown, memory controller 890 includes a global monitor 895 in accordance with an embodiment. With this configuration, global monitor 895 can handle incoming exclusive memory requests from multiple managers as described herein.

Memory system 810 couples via a bus 850 to one or more digital cores 820, which may include one or more cores and/or microcontrollers that act as processing units of the integrated circuit. In turn, digital cores 820 may couple to clock generators 830 which may provide one or more phase locked loops or other clock generator circuitry to generate various clocks for use by circuitry of the IC.

As further illustrated, IC 800 further includes power circuitry 840, which may include one or more voltage regulators. Additional circuitry may be present depending on particular implementation to provide various functionality and interaction with external devices. Such circuitry may include interface circuitry 860 which provides a digital communication interface with additional circuitry. IC 800 also may include security circuitry 870 to perform wireless security techniques.

In addition, as shown in FIG. 8, transceiver circuitry 880 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 880 includes multiple transceiver circuits 885$_1$-$n$, to communicate according to multiple wireless communication protocols. Understand while shown with this high level view, many variations and alternatives are possible.

Figure 9:
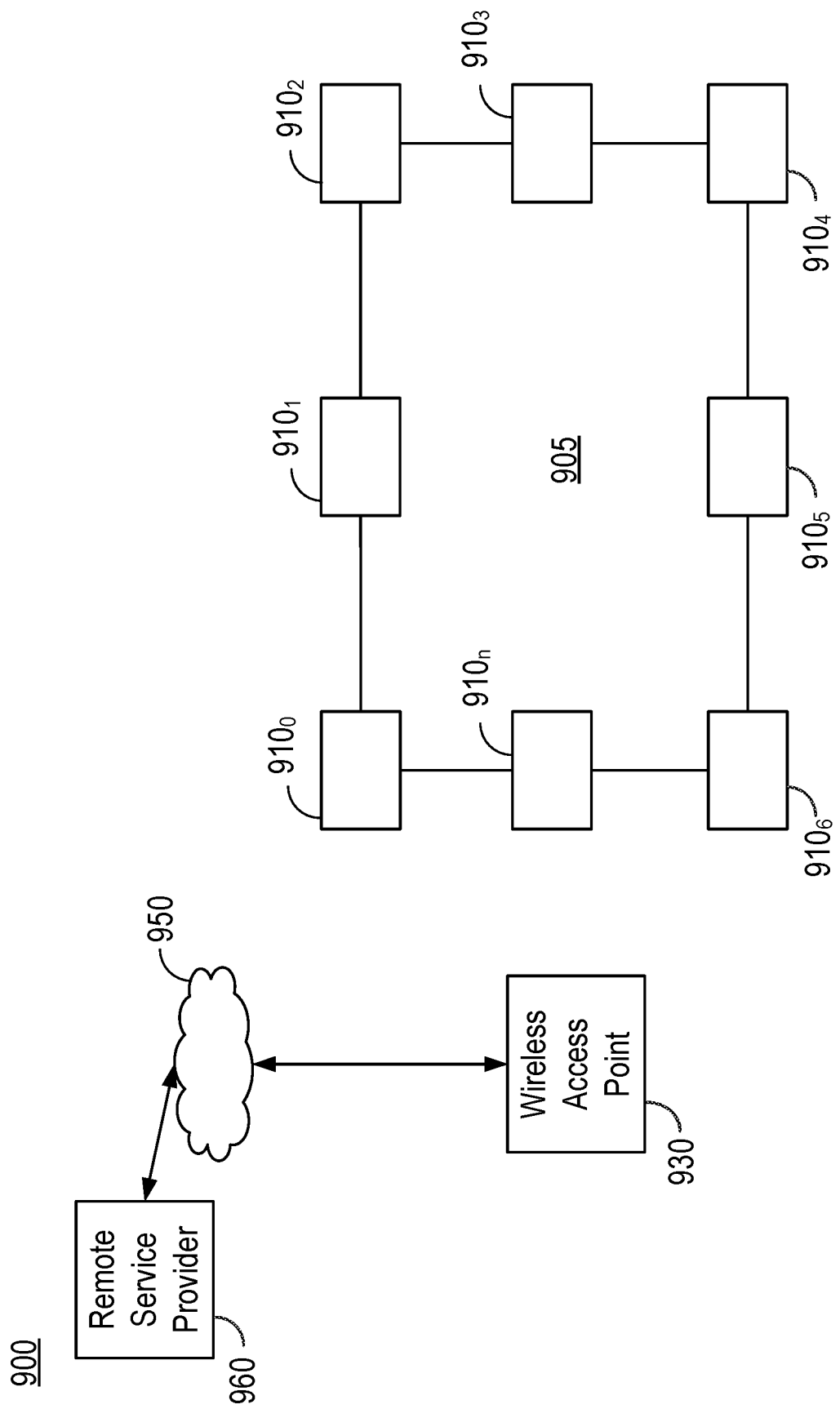
FIG. 9 is a high level diagram of a network in accordance with an embodiment.

ICs such as described herein may be implemented in a variety of different devices such as wireless stations, IoT devices or so forth. Referring now to FIG. 9, shown is a high level diagram of a network in accordance with an embodiment. As shown in FIG. 9, a network 900 includes a variety of devices, including wireless stations including smart devices such as IoT devices, access points and remote service providers, which may leverage embodiments for enabling multiple managers to exclusively access memory via a global monitor included in a multi-port memory controller as described herein.

In the embodiment of FIG. 9, a wireless network 905 is present, e.g., in a building having multiple wireless devices 910$_1$-$n$. As shown, wireless devices 910 couple to an access point 930 that in turn communicates with a remote service provider 960 via a wide area network 950, e.g., the internet. Understand while shown at this high level in the embodiment of FIG. 9, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a fabric circuit to couple between a plurality of managers and a memory;
   multi-bank memory control circuitry coupled to the fabric circuit, the multi-bank memory control circuitry to couple to a plurality of banks of the memory and comprising a plurality of first ports to receive memory requests from the plurality of managers, the multi-bank memory control circuitry to enable each of the plurality of managers to access the memory in parallel; and
   a global monitor coupled to the multi-bank memory control circuitry, the global monitor comprising a plurality of second ports and a plurality of state machines, each of the plurality of state machines to be associated with one of the plurality of managers, wherein each of the plurality of state machines is configured to enforce exclusivity of a memory region on behalf of a manager and concurrently enable non-exclusive access to the memory region.

2. The apparatus of claim 1, wherein the fabric circuit is to:
   steer exclusive memory requests to the global monitor; and
   steer non-exclusive memory requests to the multi-bank memory control circuitry.

3. The apparatus of claim 2, wherein the global monitor is to sequentially process the exclusive memory requests.

4. The apparatus of claim 1, wherein the global monitor is to initialize each of the plurality of state machines into an open state.

5. The apparatus of claim 4, wherein a first state machine of the plurality of state machines is associated with a first manager, and is to:
   receive a first exclusive memory read request for a first memory region; and
   in response to the first exclusive memory read request, transition to an exclusive state.

6. The apparatus of claim 5, wherein the first state machine is to set a tagged address to an address of the first memory region and cause data from the first memory region to be provided to the first manager.

7. The apparatus of claim 6, wherein the first state machine is to allow an exclusive write request from the first manager to occur when the exclusive write request includes:
   a first identifier that matches an identifier of the first state machine;
   a second identifier that matches a bus transaction identifier for the first exclusive memory read request; and
   the tagged address.

8. The apparatus of claim 5, wherein a second state machine of the plurality of state machines is associated with a second manager, and is to:
   receive a second exclusive memory read request for the first memory region;
   in response to the second exclusive memory read request, transition to the exclusive state; and
   in response to an exclusive write request from the first manager for the first memory region, prevent the second manager from writing to the first memory region.

9. The apparatus of claim 8, wherein when the second state machine is in the exclusive state, a third state machine of the plurality of state machines associated with a third manager is to enable the third manager to exclusively write to another memory region.

10. The apparatus of claim 5, wherein the first state machine is to prevent an exclusive write transaction to another memory region from the first manager when the first state machine is in the exclusive state.

11. The apparatus of claim 5, wherein when the first state machine is in the exclusive state, a second manager of the plurality of managers is to non-exclusively access the first memory region.

12. The apparatus of claim 11, wherein in response to the non-exclusive access to the first memory region by the second manager, the first state machine is to transition from the exclusive state to the open state.

13. The apparatus of claim 1, further comprising:
a multiplexer coupled to the plurality of managers via the plurality of second ports, the multiplexer to arbitrate between multiple memory requests from the plurality of managers and provide a selected exclusive memory request to the global monitor; and
a demultiplexer coupled between the global monitor and the multi-bank memory control circuitry, the demultiplexer to direct the selected exclusive memory request to the multi-bank memory control circuitry.

14. The apparatus of claim 1, wherein the apparatus comprises a multi-port memory controller, and the global monitor is to enable exclusive access to the memory region that is of a single byte size.

15. A method comprising:
receiving, via a plurality of ports of a global monitor, a plurality of exclusive memory requests from a plurality of processors;
selecting, from the plurality of exclusive memory requests, a first exclusive memory request having a first address of a first memory region, from a first processor of the plurality of processors, and:
transitioning a first state machine of the global monitor to an exclusive state, the first state machine associated with the first processor; and
tagging the first state machine with the first address; and
while the first state machine is in the exclusive state, monitoring access to the first memory region, comprising:
enabling at least one other processor of the plurality of processors to non-exclusively access the first memory region; or
enabling the at least one other processor to exclusively access the first memory region, wherein:
in response to the non-exclusive access to the first memory region by the at least one other processor, maintaining the first state machine in the exclusive state, to enable the first processor to exclusively access the first memory region in response to another exclusive memory request having the first address from the first processor; and
in response to the exclusive access to the first memory region by the at least one other processor, transitioning the first state machine to an open state, to prevent the first processor from exclusive access to the first memory region in response to the another exclusive memory request having the first address from the first processor.

16. The method of claim 15, further comprising arbitrating between the first exclusive memory request and the exclusive access to the first memory region by the at least one other processor to select the first exclusive memory request.

17. The method of claim 15, further comprising monitoring, via the global monitor, non-exclusive memory requests to identify the non-exclusive access to the first memory region by the at least one other processor.

18. A system comprising:
a system on chip comprising a plurality of cores, each of the plurality of cores to independently access a memory;
a multi-port memory controller coupled to the plurality of cores, the multi-port memory controller to receive memory requests from the plurality of cores and enable at least some of the plurality of cores to access the memory concurrently, the multi-port memory controller comprising:
a global monitor comprising a plurality of state machines, each of the plurality of state machines to be associated with one of the plurality of cores, wherein each of the plurality of state machines is configured to monitor a memory region for exclusive memory requests and non-exclusive memory requests; and
the memory coupled to the multi-port memory controller, the memory comprising a plurality of banks.

19. The system of claim 18, wherein the multi-port memory controller comprises:
a multiplexer coupled between the plurality of cores and the global monitor to arbitrate between a plurality of the exclusive memory requests and provide a selected exclusive memory request for a first memory region to the multi-port global monitor; and
a demultiplexer coupled between the global monitor and the plurality of banks of the memory, the demultiplexer to direct the selected exclusive memory request to one of the plurality of banks, the one of the plurality of banks having the first memory region.

20. The system of claim 18, wherein:
in response to a first exclusive read request for a first memory region from a first core, a first state machine of the plurality state machines is to transition to an exclusive state and monitor access to the first memory region; and
in response to a second exclusive read request for the first memory region from a second core, a second state machine of the plurality state machines is to transition to the exclusive state and monitor access to the first memory region, wherein in response to an exclusive write request for the first memory region from the second core, the global monitor is to allow the exclusive write request to be directed to the first memory region and transition the first state machine and the second state machine to an open state.

\* \* \* \* \*